United States Patent
Wang

(10) Patent No.: US 11,956,149 B2
(45) Date of Patent: Apr. 9, 2024

(54) PEER RELATIONSHIP MANAGEMENT METHOD AND APPARATUS, DEVICE, AND STORAGE MEDIUM

(71) Applicant: Huawei Technologies Co., Ltd., Shenzhen (CN)

(72) Inventor: Haibo Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 242 days.

(21) Appl. No.: 17/474,757

(22) Filed: Sep. 14, 2021

(65) Prior Publication Data

US 2021/0409320 A1 Dec. 30, 2021

Related U.S. Application Data

(63) Continuation of application No. PCT/CN2020/080313, filed on Mar. 20, 2020.

(30) Foreign Application Priority Data

Mar. 20, 2019 (CN) .......................... 201910213393.7

(51) Int. Cl.
*H04L 45/00* (2022.01)
*H04L 45/02* (2022.01)
*H04L 45/74* (2022.01)

(52) U.S. Cl.
CPC .............. *H04L 45/54* (2013.01); *H04L 45/02* (2013.01); *H04L 45/22* (2013.01); *H04L 45/74* (2013.01)

(58) Field of Classification Search
CPC ......... H04L 45/54; H04L 45/02; H04L 45/22; H04L 45/74; H04L 45/033; H04L 45/025; H04L 45/04; H04L 45/52
See application file for complete search history.

(56) References Cited

U.S. PATENT DOCUMENTS 7,688,714 B2 * 3/2010 Nalawade ............. H04L 45/563
709/239
7,944,926 B2 5/2011 Zhang et al.
(Continued)

FOREIGN PATENT DOCUMENTS

CN 1464704 A 12/2003
CN 101515891 A * 8/2009
(Continued)

OTHER PUBLICATIONS

Wang et al., Persistent detection and recovery of state inconsistencies, Computer Networks, 51 (2007) 1444-1448 (Year: 2007).*
(Continued)

*Primary Examiner* — Shailendra Kumar
(74) *Attorney, Agent, or Firm* — Slater Matsil, LLP

(57) ABSTRACT

This application provides a peer relationship management method and apparatus, a device, and a storage medium, and belongs to the field of network technologies. In this application, when a peer relationship between a first routing device and a second routing device is interrupted, routing entries received from the second routing device are not deleted. Services may be still processed, within a time range from a time at which the peer relationship is interrupted to a time at which the peer relationship is reestablished, by using the routing entries received from the second routing device.

14 Claims, 4 Drawing Sheets

(56) References Cited

U.S. PATENT DOCUMENTS

| | | | |
|---|---|---|---|
| 8,886,775 B2 | 11/2014 | Asati et al. | |
| 2008/0101392 A1 | 5/2008 | Zhang et al. | |
| 2009/0213862 A1* | 8/2009 | Zhang | H04L 45/00 |
| | | | 370/401 |
| 2009/0296704 A1 | 12/2009 | Kim et al. | |
| 2016/0301668 A1 | 10/2016 | Marquardt et al. | |
| 2019/0182145 A1 | 6/2019 | Yan et al. | |

FOREIGN PATENT DOCUMENTS

| | | | |
|---|---|---|---|
| CN | 101515891 A | 8/2009 | |
| CN | 101521616 A | 9/2009 | |
| CN | 101631130 A | 1/2010 | |
| CN | 102624635 A | 8/2012 | |
| CN | 105915457 A | 8/2016 | |
| CN | 106059924 A | 10/2016 | |
| CN | 106254251 A | 12/2016 | |
| CN | 107888495 A | 4/2018 | |
| CN | 108123876 A | 6/2018 | |

OTHER PUBLICATIONS

Wang, L. et al., "Persistent detection and recovery of state inconsistencies," Computer Networks, University of Memphis, Computer Science Department, Dec. 28, 2005, 15 pages, Memphis, TN, USA.
Xu, X. et al., BGP Neighbor Discovery; draft-xu-idr-neighbor-autodiscovery-10, Network Working Group, Oct. 22, 2018, 33 pages.

* cited by examiner

PEER RELATIONSHIP MANAGEMENT METHOD AND APPARATUS, DEVICE, AND STORAGE MEDIUM

CROSS-REFERENCE TO RELATED APPLICATIONS

This application is a continuation of International Application No. PCT/CN2020/080313, filed on Mar. 20, 2020, which claims priority to Chinese Patent Application No. 201910213393.7, filed on Mar. 20, 2019. The disclosures of the aforementioned applications are hereby incorporated by reference in their entireties.

TECHNICAL FIELD

This application relates to the field of network technologies, and in particular, to a peer relationship management method and apparatus, a device, and a storage medium.

BACKGROUND

Usually, a large quantity of routing devices are deployed in a network. Each routing device can establish a peer relationship with another routing device. Each routing device and the another routing device exchange routing entries stored in each other based on the peer relationship. Each routing device may further manage a peer relationship between the routing device and the another routing device, for example, break the peer relationship with the another routing device, or maintain the peer relationship with the another routing device.

A routing device 1 and a routing device 2 are used as an example. A process in which the two routing devices manage a peer relationship between each other may include: When the routing device 1 establishes the peer relationship with the routing device 2, the routing device 2 sends, to the routing device 1, a currently locally stored routing entry, and the routing device 1 receives the routing entry from the routing device 2, and stores the received routing entry in a routing table of the routing device 1; when the peer relationship between the routing device 1 and the routing device 2 is interrupted, the routing device 1 deletes, from the routing table, the routing entry previously received from the routing device 2; and when the peer relationship between the routing device 1 and the routing device 2 is reestablished, the routing device 2 resends, to the routing device 1, the currently locally stored routing entry, and the routing device 1 re-receives the routing entry from the routing device 2, and re-stores the received routing entry in the routing table of the routing device 1.

It can be learned from the foregoing example that, within a time range from a time at which the peer relationship is interrupted to a time at which the peer relationship is reestablished, because the routing device 1 deletes routing entries received from the routing device 2, the routing device 1 cannot process services by using the routing entries received from the routing device 2, and consequently, the services related to these routing entries are damaged.

SUMMARY

Embodiments of this application provide a peer relationship management method and apparatus, a device, and a storage medium, to resolve a technical problem in a related technology that a service is damaged within a time range from a time at which a peer relationship is interrupted to a time at which the peer relationship is reestablished. The technical solutions are as follows.

According to a first aspect, a peer relationship management method is provided. The method is applied to a first routing device, and the method includes: not deleting a first routing entry in a routing table when a peer relationship between the first routing device and a second routing device is interrupted, where the first routing entry is a routing entry received by the first routing device from the second routing device; processing a service by using the first routing entry; receiving a second routing entry from the second routing device when the peer relationship is reestablished; and deleting a third routing entry from the routing table based on the first routing entry and the second routing entry, where the third routing entry belongs to the first routing entry and does not belong to the second routing entry.

In the method provided in this embodiment, when the peer relationship between the first routing device and the second routing device is interrupted, routing entries received from the second routing device are not deleted. Services may be still processed, within a time range from a time at which the peer relationship is interrupted to a time at which the peer relationship is reestablished, by using the routing entries received from the second routing device. This avoids impact on the services related to the routing entries after the routing entries are deleted. In addition, if the second routing device updates a locally stored routing entry within the time range from the time at which the peer relationship is interrupted to the time at which the peer relationship is reestablished, and consequently, a routing entry received by the first routing device after the peer relationship is reestablished is inconsistent with a routing entry received before the peer relationship is interrupted, the first routing device may delete a differential routing entry between the two received routing entries from the routing table, to ensure timeliness and accuracy of the routing entry in the routing table. In this way, accuracy of processing the service by using the routing entry is ensured.

Optionally, before the receiving a second routing entry from the second routing device, the method further includes: writing a ready-to-delete flag into the first routing entry; and the deleting a third routing entry from the routing table based on the first routing entry and the second routing entry includes: selecting the third routing entry from the first routing entry based on the ready-to-delete flag in the first routing entry and the second routing entry.

Optionally, the selecting the third routing entry from the first routing entry based on the ready-to-delete flag in the first routing entry and the second routing entry includes: for any routing entry in the first routing entry, deleting a ready-to-delete flag in the routing entry from the first routing entry when the second routing entry includes the routing entry; and selecting, from the first routing entry, a routing entry including a ready-to-delete flag as the third routing entry.

Optionally, before the not deleting a first routing entry in a routing table, the method further includes any one of the following: interrupting the peer relationship when a target address family capability is enabled for the second routing device, where the target address family capability is different from any address family capability that has been enabled for the second routing device; interrupting the peer relationship when a configuration instruction is received, where the configuration instruction is used to instruct the first routing device to update stored configuration information related to the second routing device; and interrupting the peer relationship when a first notification message is received from the second routing device, where the first notification message is used to notify the first routing device to interrupt the peer relationship and not to delete the first routing entry.

Optionally, the method further includes: generating a second notification message when the configuration instruction is received, where the second notification message is used to notify the second routing device to interrupt the peer relationship and not to delete a fourth routing entry, and the fourth routing entry is a routing entry received by the second routing device from the first routing device; and sending the second notification message to the second routing device.

Optionally, the method further includes any one of the following: starting a timer when the peer relationship is interrupted, and when duration of the timer reaches preset duration, performing a step of deleting the third routing entry from the routing table; and when a route update end message of the second routing device is received, performing a step of deleting the third routing entry from the routing table.

Optionally, before the not deleting a first routing entry in a routing table when a peer relationship between the first routing device and a second routing device is interrupted, the method further includes: enabling a target capability for the second routing device, where the target capability is a capability of not deleting the first routing entry within a time range from a time at which the peer relationship is interrupted to a time at which the peer relationship is reestablished.

According to a second aspect, a peer relationship management apparatus is provided. The apparatus is configured to perform the foregoing peer relationship management method. Specifically, the peer relationship management apparatus includes a function module configured to perform the peer relationship management method according to any one of the first aspect or the optional manners of the first aspect.

According to a third aspect, a routing device is provided. The routing device includes a processor and a transceiver. The processor is configured to load and run instructions, to implement the peer relationship management method according to any one of the first aspect or the optional manners of the first aspect. The transceiver is configured to perform receiving and sending steps in the peer relationship management method according to any one of the first aspect or the optional manners of the first aspect.

According to a fourth aspect, a computer-readable storage medium is provided. The storage medium stores at least one instruction, and the instruction is loaded and executed by a processor to implement the peer relationship management method according to any one of the first aspect or the optional manners of the first aspect.

According to a fifth aspect, a computer program product is provided. The computer program product includes computer program code. When the computer program code is run on a computer, the computer is enabled to perform the peer relationship management method according to any one of the first aspect or the optional manners of the first aspect.

According to a sixth aspect, a chip is provided, including a processor, configured to invoke and run instructions stored in a memory, to enable a device in which the chip is installed to perform the peer relationship management method according to any one of the first aspect or the optional manners of the first aspect.

According to a seventh aspect, another chip is provided, including an input interface, an output interface, a processor, and a memory. The input interface, the output interface, the processor, and the memory are connected to each other through an internal connection path. The processor is configured to execute code in the memory. When the code is executed, the processor is configured to perform the peer relationship management method according to any one of the first aspect or the optional manners of the first aspect.

DETAILED DESCRIPTION OF ILLUSTRATIVE EMBODIMENTS

To make the objectives, technical solutions, and advantages of this application clearer, the following further describes implementations of this application in detail with reference to the accompanying drawings.

Figure 1:
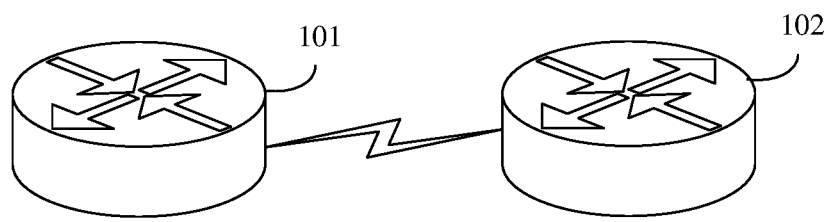
FIG. 1 is an architectural diagram of an implementation environment of a peer relationship management method according to an embodiment of this application.

FIG. 1 is an architectural diagram of an implementation environment of a peer relationship management method according to an embodiment of this application. The implementation environment includes a first routing device 101 and a second routing device 102. The first routing device 101 and the second routing device 102 may be connected through a network. The first routing device 101 may be a router, a layer 3 switch, or the like. Optionally, the first routing device 101 may be any routing device that supports a border gateway protocol (BGP). For example, the first routing device 101 may be a provider edge (PE) device, and the first routing device may be deployed at an edge of an autonomous system (AS). A form of the second routing device 102 is similar to a form of the first routing device 101, and details are not described herein again. The PE device is an edge device of a provider backbone network, the PE device is an important network node, and the PE device may be connected to a customer edge (CE) device and a provider backbone router.

Figure 2:
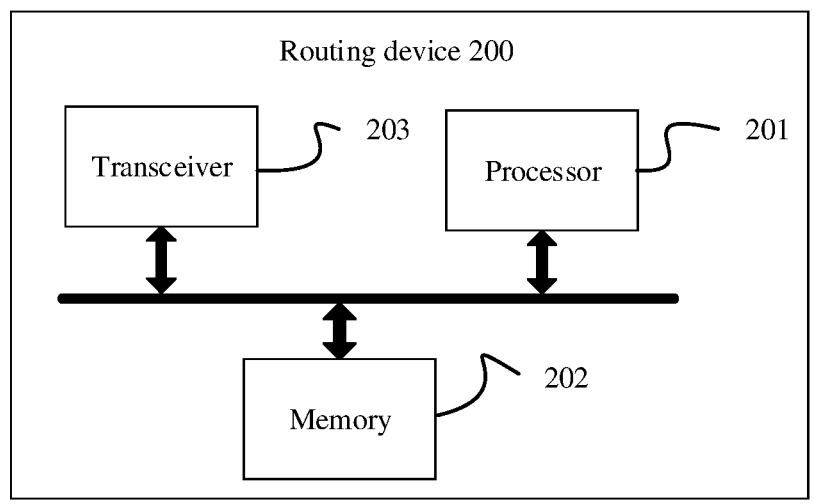
FIG. 2 is a schematic structural diagram of a routing device 200 according to an embodiment of this application.

FIG. 2 is a schematic structural diagram of a routing device 200 according to an embodiment of this application. The routing device 200 may be at least one of a first routing device or a second routing device in the following embodiment. The routing device 200 may greatly vary with configuration or performance, and may include a processor (CPU) 201, a memory 202, and a transceiver 203. The memory 202 stores instructions. The processor 201 is configured to invoke and run the instructions stored in the memory 202, to perform at least one of step 401, step 402, step 403, step 404, step 407, step 408, step 409, step 410, step 411, step 412, step 413, step 416, and step 417 in a peer relationship management method provided in the following embodiment. The processor is further configured to control the transceiver 203 to perform at least one of step 405, step 406, step 414, and step 415 in the following embodiment. The processor 201, the memory 202, and the transceiver 203 may be connected through a bus, and can communicate through the bus. Certainly, the routing device 200 may further include another component configured to implement a function of the device. Details are not described herein.

Figure 3:
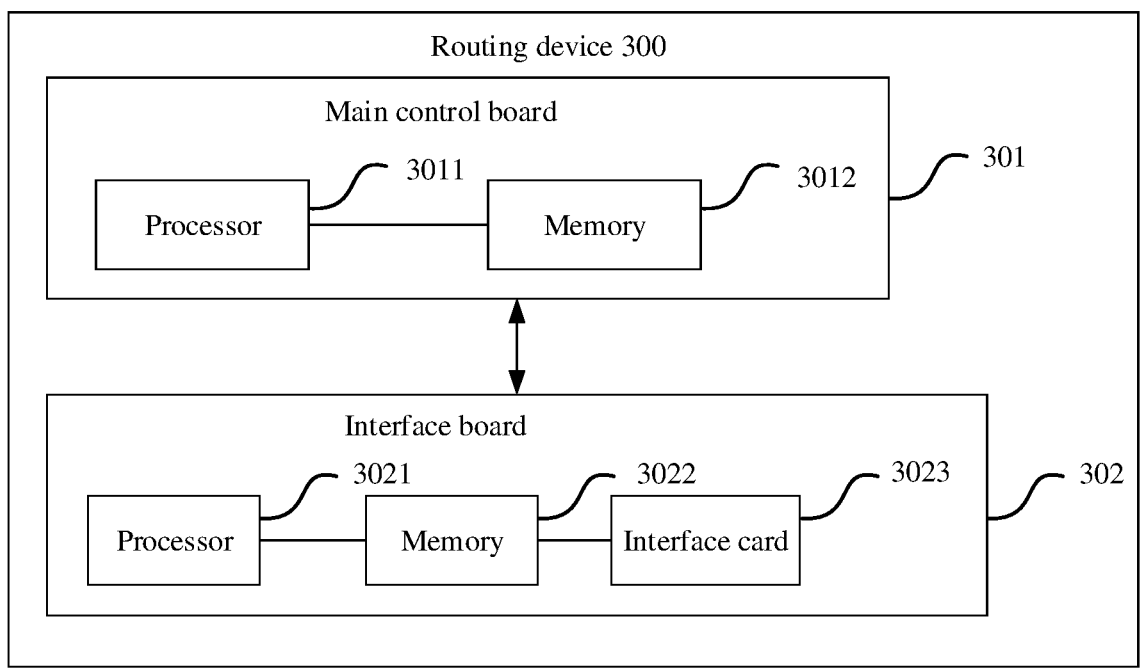
FIG. 3 is a schematic structural diagram of a routing device 300 according to an embodiment of this application.

FIG. 3 is a schematic structural diagram of a routing device 300 according to an embodiment of this application. The routing device 300 may be at least one of a first routing device or a second routing device in the following embodiment. The routing device 300 may greatly vary with configuration or performance, and may include a main control board 301 and an interface board 302. The main control board 301 includes a processor (CPU) 3011 and a memory 3012. The interface board 302 includes a processor 3021, a memory 3022, and an interface card 3023. The processor 3021 of the interface board 302 is configured to invoke a program instruction in the memory 3022 of the interface board 302 to perform at least one of step 405, step 406, step 414, and step 415 in the following embodiment. The processor 3011 of the main control board 301 is configured to invoke a program instruction in the memory 3012 of the main control board 301 to perform at least one of step 401, step 402, step 403, step 404, step 407, step 408, step 409, step 410, step 411, step 412, step 413, step 416, and step 417 in the following embodiment.

Figure 4:
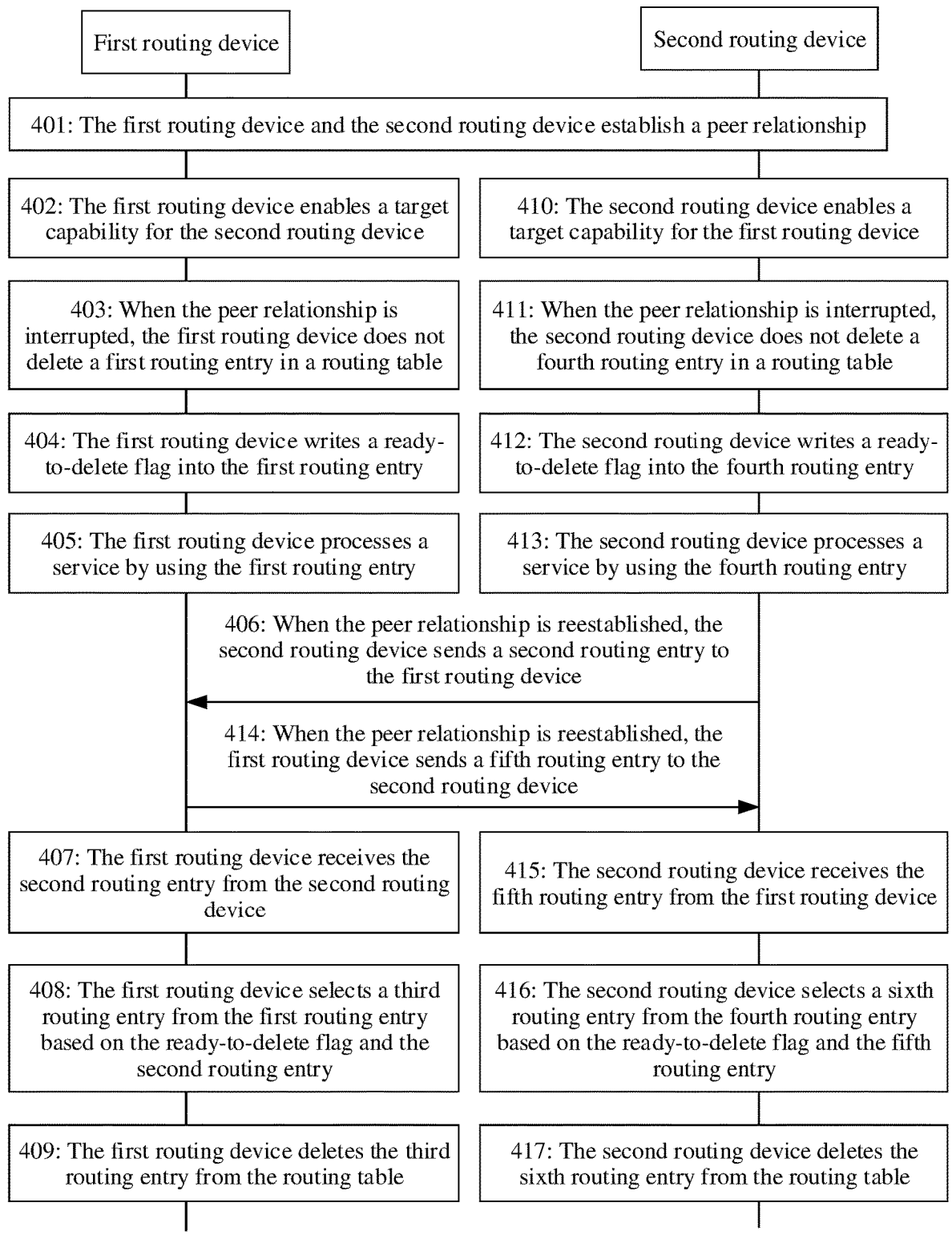
FIG. 4 is a flowchart of a peer relationship management method according to an embodiment of this application.

FIG. 4 is a flowchart of a peer relationship management method according to an embodiment of this application. As shown in FIG. 4, the method includes step 401 to step 417 performed by a first routing device and a second routing device.

401: The first routing device and the second routing device establish a peer relationship.

The first routing device and the second routing device may establish the peer relationship based on a routing protocol. After the peer relationship is established, the first routing device and the second routing device may exchange routing entries stored in each other based on the peer relationship. The first routing device may be referred to as a peer device of the second routing device, and the second routing device may be referred to as a peer device of the first routing device.

In a possible implementation, the first routing device and the second routing device may support a BGP, and the first routing device and the second routing device may establish a BGP peer relationship based on the BGP. After the BGP peer relationship is established, the first routing device and the second routing device may exchange the routing entries of each other based on a BGP route advertisement principle. The BGP is a dynamic routing protocol used to exchange routing entries between different ASs. It is stipulated in the BGP route advertisement principle that after a routing device establishes a BGP peer relationship with another routing device, the routing device sends all locally stored routing entries to the another routing device with which the routing device establishes the BGP peer relationship.

Specifically, the first routing device may send the routing entry stored in the first routing device to the second routing device, and the second routing device may send the routing entry stored in the second routing device to the first routing device. In this way, the first routing device may receive the routing entry sent by the second routing device, and store the routing entry of the second routing device in a local routing table. The second routing device may receive the routing entry sent by the first routing device, and store the routing entry of the first routing device in a local routing table. The first routing device and the second routing device may exchange the routing entries in a full update manner when exchanging the routing entries for the first time. To be specific, the first routing device may send all locally stored routing entries to the second routing device, and the second routing device may send all locally stored routing entries to the first routing device. The first routing device and the second routing device may exchange the routing entries in an incremental update manner when exchanging routing entries for the second time and each time after the second time. In other words, the first routing device may send an updated and locally stored routing entry to the second routing device, and the second routing device may send an updated and locally stored routing entry to the first routing device.

In a possible implementation, the first routing device may support at least one address family capability, and the second routing device may support at least one address family capability. The first routing device and the second routing device may establish, based on any address family capability supported by each other, a peer relationship corresponding to the address family capability, to exchange, after the peer relationship is established, routing entries corresponding to the address family capability. An example in which the address family capability is an internet protocol version 4 (IPv4) unicast capability is used. If both the first routing device and the second routing device support the IPv4 unicast capability, the first routing device and the second routing device may establish an IPv4 unicast peer relationship based on the IPv4 unicast capability, and exchange IPv4 routing entries stored in each other based on the IPv4 unicast peer relationship.

Certainly, the IPv4 unicast capability is merely an example of the address family capability. The address family capability includes but is not limited to one or more of the IPv4 unicast capability, an internet protocol version 6 (IPv6) unicast capability, a layer 3 virtual private network (L3VPN) capability, an Ethernet virtual private network (EVPN) capability, a virtual network version 4 (VPNv4) capability, a multicast virtual private network (MVPN) capability, an IP address-based outbound route filter (IP-ORF) capability, a multicast distribution tree (MDT) capability, and a virtual private LAN service (VPLS) capability. Correspondingly, the peer relationship includes but is not limited to one or more of the IPv4 unicast peer relationship, a VPNv4 peer relationship, an IPv6 unicast peer relationship, an L3VPN peer relationship, an EVPN peer relationship, an MVPN peer relationship, an ORF peer relationship, an MDT peer relationship, and a VPLS peer relationship. This embodiment sets no limitation on an address family capability supported by the first routing device and the second routing device and a type of a peer relationship established based on the address family capability.

402: The first routing device enables a target capability for the second routing device.

The target capability may be a capability of not deleting a first routing entry within a time range from a time at which the peer relationship is interrupted to a time at which the peer relationship is reestablished. The first routing entry is a routing entry received by the first routing device from the second routing device, namely, a routing entry learned by the first routing device from the second routing device. The first routing entry is some routing entries in the routing table of the first routing device. For example, it is assumed that the routing table of the first routing device includes 40,000 routing entries, which are marked as a routing entry 1 to a routing entry 40000. The routing entry 1 to the routing entry 10000 are routing entries received from the second routing device. The routing entry 10001 to the routing entry 20000 are routing entries received from a routing device other than the second routing device. The routing entry 20001 to the routing entry 40000 are routing entries manually configured by an administrator. Therefore, the routing entry 1 to the routing entry 10000 are the first routing entry.

Optionally, the target capability may be a capability of not deleting the first routing entry in a time period in which the peer relationship is upgraded. The target capability may be referred to as a smooth upgrade capability, for example, referred to as a BGP smooth upgrade capability. The BGP is used as an example. It is assumed that before the BGP peer relationship is upgraded, N types of BGP peer relationships are established between the first routing device and the second routing device based on N types of address family capabilities. When M types of BGP peer relationships need to be added between the first routing device and the second routing device, the first routing device and the second routing device may interrupt the N types of BGP peer relationships, and use the target capability to not delete routing entries previously received from each other. When the peer relationship is reestablished, the first routing device and the second routing device may establish (N+M) types of BGP peer relationships based on (N+M) types of address family capabilities. This implements smooth upgrade of the peer relationship. N is a positive integer, and M is a positive integer.

In an example, if the IPv4 unicast peer relationship and the IPv6 unicast peer relationship have been deployed between the first routing device and the second routing device, when the VPNv4 peer relationship needs to be newly added between the first routing device and the second routing device, the first routing device and the second routing device may interrupt the IPv4 unicast peer relationship and the IPv6 unicast peer relationship. The first routing device may use the target capability to not delete the IPv4 routing entry and an IPv6 routing entry that are received from the second routing device, and the second routing device may use the target capability to not delete the IPv4 routing entry and an IPv6 routing entry that are received from the first routing device. After the peer relationship is reestablished, the first routing device and the second routing device may be upgraded, where the IPv4 unicast peer relationship, the IPv6 unicast peer relationship, and the VPNv4 peer relationship are established between the first routing device and the second routing device. In addition, in a process in which the peer relationship is upgraded, the first routing device and the second routing device may still process services based on the IPv4 routing entries and IPv6 routing entries that are previously received from a peer end, to avoid impact on the services. This implements smooth upgrade of the VPNv4 peer relationship.

In a process in which the target capability is enabled, the first routing device may receive an enabling instruction, and the first routing device may enable the target capability for the second routing device according to the enabling instruction. The enabling instruction is used to instruct the first routing device to enable the target capability for the second routing device. The enabling instruction may include an identifier of the second routing device, and the first routing device may obtain the identifier of the second routing device from the enabling instruction, to determine, based on the identifier of the second routing device, to enable the target capability for the second routing device. The identifier of the second routing device may be a name, a network address, a number, or the like of the second routing device. The enabling instruction may be triggered based on a configuration operation of the administrator.

403: When the peer relationship is interrupted, the first routing device does not delete the first routing entry in the routing table.

Optionally, this embodiment may be applied to an inventory network. The inventory network is a network that currently runs. Correspondingly, the first routing device may interrupt the peer relationship with the second routing device in a running process, and does not delete the first routing entry. The first routing device may interrupt the peer relationship in a process of executing the service. In an example, the peer relationship may be interrupted in any one of the following scenario 1 to scenario 3.

Scenario 1: When the target address family capability is enabled for the second routing device, the first routing device interrupts the peer relationship, and the target address family capability is different from any address family capability that has been enabled for the second routing device.

Scenario 1 can be considered as a scenario in which the peer relationship is upgraded. In scenario 1, peer relationships of one or more address families may have been established between the first routing device and the second routing device. When a new peer relationship of one or more address families needs to be deployed, the peer relationships may be interrupted.

Specifically, for example, the newly deployed peer relationship between the first routing device and the second routing device is referred to as a target peer relationship, and an address family corresponding to the target peer relationship is referred to as the target address family capability. The first routing device may enable the target address family capability for the second routing device, and interrupt the peer relationship with the second routing device. Similarly, the second routing device may enable the target address family capability for the first routing device, and interrupt the peer relationship with the first routing device. After the first routing device and the second routing device enable the target address family capability for each other, the first routing device and the second routing device may establish the target peer relationship based on the target address family capability.

That the IPv4 unicast peer relationship has been established between the first routing device and the second routing device is used as an example. When the first routing device needs to establish the VPNv4 peer relationship with the second routing device, the first routing device may enable a VPNv4 capability for the second routing device, and interrupt the IPv4 unicast peer relationship with the second routing device. The second routing device may enable the VPNv4 capability for the first routing device, and interrupt the IPv4 unicast peer relationship with the first routing device. When an IP-ORF peer relationship needs to be deployed between the first routing device and the second routing device, the first routing device may enable the IP-ORF capability for the second routing device, and interrupt the IPv4 unicast peer relationship with the second routing device. The second routing device may enable the IP-ORF capability for the first routing device, and interrupt the IPv4 unicast peer relationship with the first routing device.

For a specific process in which the target address family capability is enabled for the second routing device, the first routing device may receive an address family view display instruction, and display an address family view interface according to the address family view display instruction. The address family view interface includes an identifier of at least one peer device for which the first routing device has enabled the target address family capability. The first routing device may receive the enabling instruction in the address family view interface, obtain the identifier of the second routing device from the enabling instruction, and enable the target address family capability for the second routing device.

According to the method provided in this embodiment in scenario 1, a problem of service interruption caused by deleting the routing entry may be avoided subsequently by not deleting the routing entry. Therefore, an existing service is not affected when a live network device deploys a new address family capability based on an existing peer relationship, thereby greatly improving deployment efficiency of the new service. This facilitates addition of various new functions to the deployed peer relationship, reduces workload of a provider's migration operation in the middle of night, and facilitates upgrade and evolution of a service of a telecommunication network.

Scenario 2: When receiving a configuration instruction, the first routing device interrupts the peer relationship.

The first routing device may receive the configuration instruction, obtain the identifier of the second routing device from the configuration instruction, interrupt the peer relationship with the second routing device, and update stored configuration information related to the second routing device. The configuration instruction may be triggered based on an input operation of a user. The configuration instruction is used to instruct the first routing device to update the stored configuration information related to the second routing device. The configuration information related to the second routing device may include an address family capability that has been enabled by the first routing device for the second routing device, a network address of the second routing device, a routing entry received from the second routing device, a communications protocol between the first routing device and the second routing device, and the like.

In an example, the configuration instruction may instruct the first routing device to reset the peer relationship with the second routing device, that is, first bring the second routing device offline as a peer device, and then bring the second routing device online as the peer device. In this case, the first routing device may receive the configuration instruction, interrupt the peer relationship with the second routing device, and reset the peer relationship with the second routing device according to the configuration instruction.

Scenario 3: When receiving a first notification message from the second routing device, the first routing device interrupts the peer relationship.

The first notification message is used to notify the first routing device to interrupt the peer relationship and not to delete the first routing entry. The first notification message may be a new type of notification packet. For example, if being applied to a peer relationship upgrade scenario, the first notification message may be used to notify a peer end to perform smooth upgrade. In other words, service processing is not affected based on that the peer relationship is upgraded. In an example, it may be stipulated in the BGP that when a local end and a peer end need to upgrade a peer relationship, the local end needs to send, to the peer end, a notification (English: notification) packet for notifying the peer end not to delete a routing entry, where the notification packet is the first notification message.

In a possible implementation, for an interaction process that is of the first routing device and the second routing device and that is for the first notification message, when the second routing device is about to update stored configuration information related to the first routing device, for example, when the second routing device receives a configuration instruction, the second routing device may generate the first notification message, and send the first notification message to the first routing device. In this way, the first routing device may receive the first notification message from the second routing device.

Similarly, in the foregoing scenario 2, when the first routing device receives the configuration instruction, the first routing device may generate a second notification message, and send the second notification message to the second routing device. After receiving the second notification message, the second routing device may interrupt the peer relationship with the first routing device. The second notification message is used to notify the second routing device to interrupt the peer relationship and not to delete the fourth routing entry, and the fourth routing entry is a routing entry received by the second routing device from the first routing device.

404: The first routing device writes a ready-to-delete flag into the first routing entry.

A flag is newly designed in this embodiment, and is referred to as the ready-to-delete flag herein. The ready-to-delete flag is used to select, after the peer relationship is reestablished, a routing entry that needs to be deleted. The ready-to-delete flag may be in any data form such as a number, a letter, or a character string, and a specific value of the ready-to-delete flag may be pre-stored in the first routing device.

Specifically, the first routing device may select the first routing entry from the routing table, and write a ready-to-delete flag into each routing entry in the first routing entry. The first routing device may select, from the routing table based on a source of each routing entry in the routing table, a routing entry whose source is the second routing device as the first routing entry.

405: The first routing device processes a service by using the first routing entry.

The service in step 405 may be any service depending on the first routing entry. A specific type of the service is not limited in this embodiment. For example, the first routing device may forward a received packet by using the first routing entry. Specifically, after the peer relationship is interrupted, when the first routing device receives the packet, the first routing device may obtain a destination address of the packet from the packet, query the first routing entry based on the destination address of the packet, obtain, from the first routing entry, a next-hop address corresponding to the destination address, and send the packet to the next-hop address. In other words, in a period from the time at which the peer relationship is interrupted to the time at which the peer relationship is reestablished, a packet whose destination address belongs to the first routing entry can still be normally forwarded by the first routing device. The first routing device cannot find the next-hop address of the packet due to deletion of the first routing entry, but the first routing device does not discard the packet, thereby preventing the service from being damaged.

406: When the peer relationship is reestablished, the second routing device sends a second routing entry to the first routing device.

The second routing entry is a routing entry sent by the second routing device to the first routing device when the peer relationship is reestablished. When the peer relationship is reestablished, the second routing device may send the stored second routing entry to the first routing device. The second routing entry and the first routing entry may be different or the same. The difference may be that some of the second routing entry and the first routing entry are the same and some of the first routing entry and the second routing entry are different, or may be that the second routing entry and the first routing entry are different.

Specifically, within the time range from the time at which the peer relationship is interrupted to the time at which the peer relationship is reestablished, if the second routing device updates the stored routing entry, for example, deletes the routing entry, modifies the routing entry, or replaces the routing entry with another routing entry, a routing entry resent by the second routing device after the peer relationship is reestablished is inconsistent with a routing entry sent before the peer relationship is interrupted because the routing entry is updated. In this case, the second routing entry is different from the first routing entry. However, within the time range from the time at which the peer relationship is interrupted to the time at which the peer relationship is reestablished, if the second routing device does not update the stored routing entry, a routing entry resent by the second routing device after the peer relationship is reestablished is consistent with a routing entry sent before the peer relationship is interrupted. Therefore, the second routing entry is the same as the first routing entry.

407: The first routing device receives the second routing entry from the second routing device.

408: The first routing device selects a third routing entry from the first routing entry based on the ready-to-delete flag in the first routing entry and the second routing entry.

409: The first routing device deletes the third routing entry from the routing table.

The third routing entry belongs to the first routing entry and does not belong to the second routing entry, the third routing entry may be considered as a differential routing entry obtained by comparing the first routing entry with the second routing entry, and the third routing entry may be referred to as an aged routing entry. For example, it is assumed that before the peer relationship is interrupted, the first routing device receives 10,000 routing entries from the second routing device, which are a routing entry 1 to a routing entry 10000 respectively. In the period from the time at which the peer relationship is interrupted to the time at which the peer relationship is reestablished, the second routing device deletes 1,000 routing entries, which are the routing entry 1 to the routing entry moo respectively. After the peer relationship is reestablished, the first routing device receives the remaining 9,000 routing entries, namely the routing entry 1001 to the routing entry 10000, from the second routing device. In this case, the 1,000 routing entries from the routing entry 1 to the routing entry woo are the third routing entry.

After the first routing device deletes the third routing entry from the routing table, the first routing device may be restored to a normal state, and may process a service based on a normal processing procedure.

In a possible implementation, a process in which the third routing entry is deleted may include the following step 1 and step 2:

Step 1: For any routing entry in the first routing entry, the first routing device deletes the ready-to-delete flag in the routing entry from the first routing entry when the second routing entry includes the routing entry.

The first routing device may traverse each routing entry in the first routing entry. For any routing entry in the first routing entry, the first routing device may determine whether the routing entry is a routing entry in the second routing entry. When the routing entry is the routing entry in the second routing entry, the first routing device deletes the ready-to-delete flag in the routing entry from the first routing entry. In a possible implementation, the first routing device may obtain a prefix of the routing entry and a prefix of the second routing entry, and compare whether the prefix of the routing entry is the same as the prefix of the second routing entry. When the prefix of the routing entry is the same as the prefix of the second routing entry, it is determined that the routing entry is the routing entry in the second routing entry. In addition, when the routing entry is not the routing entry in the second routing entry, the first routing device may not delete the ready-to-delete flag in the routing entry.

For example, it is assumed that the first routing entry is the routing entry 1 to the routing entry 10000, and the first routing device receives the routing entry 1001 to the routing entry 10000 from the second routing device. The first routing device may delete ready-to-delete flags in the routing entry 1001 to the routing entry 10000 from the first routing entry, but does not delete ready-to-delete flags in the routing entry 1 to the routing entry 1000.

Step 2: The first routing device selects, from the first routing entry, the routing entry including the ready-to-delete flag, uses the routing entry as the third routing entry, and deletes the third routing entry.

The first routing device may traverse each routing entry in the first routing entry. For any routing entry in the first routing entry, the first routing device may determine whether the routing entry includes the ready-to-delete flag. If the routing entry includes the ready-to-delete flag, the first routing device uses the routing entry as the third routing entry, and deletes the routing entry. If the routing entry does not include the ready-to-delete flag, the first routing device may not delete the routing entry.

For example, it is assumed that in step 1, the first routing device deletes the ready-to-delete flags in the routing entry 1001 to the routing entry 10000, but does not delete the ready-to-delete flags in the routing entry 1 to the routing entry 1000. In step 2, the first routing device may select, from the routing entry 1 to the routing entry 10000, the routing entry 1 to the routing entry 1000 that still have the ready-to-delete flags, and delete the routing entry 1 to the routing entry 1000.

It should be noted that the ready-to-delete flag is written into the first routing entry and the third routing entry is deleted based on the ready-to-delete flag in the first routing entry and the second routing entry is only an optional manner of deleting the third routing entry, but is not a mandatory manner of deleting the third routing entry. In another possible implementation, the third routing entry may also be deleted in another manner. For example, when the second routing entry is received, it may be determined whether each routing entry in the first routing entry belongs to the second routing entry. If any routing entry belongs to the second routing entry, the routing entry is not deleted. If the routing entry does not belong to the second routing entry, the routing entry is used as the third routing entry, and the routing entry is deleted. Certainly, the first routing device may alternatively delete the third routing entry from the routing table based on the first routing entry and the second routing entry in another manner. This is not limited in this embodiment.

Optionally, the first routing device may set a trigger condition, and delete the third routing entry from the routing table when the trigger condition is met. In an example, the trigger condition may include any one of the following trigger condition 1 to trigger condition 2.

Trigger condition 1: When the peer relationship is interrupted, a timer is started, and when duration of the timer reaches preset duration, the first routing device deletes the third routing entry from the routing table.

The first routing device may set the timer, start the timer when the peer relationship is interrupted, and wait when the duration of the timer does not reach the preset duration. When the duration of the timer reaches the preset duration, the first routing device may consider by default that the peer relationship between the first routing device and the second routing device has been reestablished, and the second routing device has sent the second routing entry to the first routing device. Therefore, the first routing device starts to delete the third routing entry. The preset duration may be set according to experience, and the preset duration may be pre-stored in the first routing device.

Trigger condition 2: When receiving a route update end message of the second routing device, the first routing device deletes the third routing entry from the routing table.

An end of routing information base (EOR) message indicates that the second routing device has sent the routing entry to the first routing device. Specifically, the second routing device may determine whether the routing entry has been sent. When the routing entry has been sent, the second routing device may generate the EOR message, and send the EOR message to the first routing device. In this case, the first routing device receives the EOR message of the second routing device, and starts to delete the third routing entry.

It should be noted that the foregoing is described by using an example from a perspective of the first routing device, and the second routing device may similarly perform the foregoing procedure. Specifically, this embodiment may further include the following step 410 to step 417.

410: The second routing device may enable the target capability for the first routing device.

411: When the peer relationship is interrupted, the second routing device does not delete the fourth routing entry in a routing table of the second routing device.

412: The second routing device writes a ready-to-delete flag into the fourth routing entry.

413: The second routing device processes a service by using the fourth routing entry.

414: When the peer relationship is reestablished, the first routing device sends a fifth routing entry to the second routing device.

415: The second routing device receives the fifth routing entry from the first routing device.

416: The second routing device selects a sixth routing entry from the fourth routing entry based on the ready-to-delete flag in the fourth routing entry and the fifth routing entry, where the sixth routing entry belongs to the fourth routing entry and does not belong to the fifth routing entry.

417: The second routing device deletes the sixth routing entry from the routing table of the second routing device.

It should be noted that, step 410 to step 417 are optional steps. If the foregoing step 410 to step 417 are performed, the second routing device may not delete the routing entry received from the first routing device when the peer relationship is interrupted, and may still process the service by using the routing entry received from the first routing device within the time range from the time at which the peer relationship is interrupted to the time at which the peer relationship is reestablished, thereby preventing the service from being damaged by deletion of the routing entry. In addition, step 410 to step 417 are similar to step 402 to step 409, and details are not described herein again.

In the method provided in this embodiment, when the peer relationship between the first routing device and the second routing device is interrupted, routing entries received from the second routing device are not deleted. Services may be still processed, within the time range from the time at which the peer relationship is interrupted to the time at which the peer relationship is reestablished, by using the routing entries received from the second routing device. This avoids impact on the services related to the routing entries after the routing entries are deleted. In addition, if the second routing device updates a locally stored routing entry within the time range from the time at which the peer relationship is interrupted to the time at which the peer relationship is reestablished, and consequently, a routing entry received by the first routing device after the peer relationship is reestablished is inconsistent with a routing entry received before the peer relationship is interrupted, the first routing device may delete a differential routing entry between the two received routing entries from the routing table, to ensure timeliness and accuracy of the routing entry in the routing table. In this way, accuracy of processing the service by using the routing entry is ensured.

All the foregoing optional technical solutions may be randomly combined to form optional embodiments of this application. Details are not described herein again.

Figure 5:
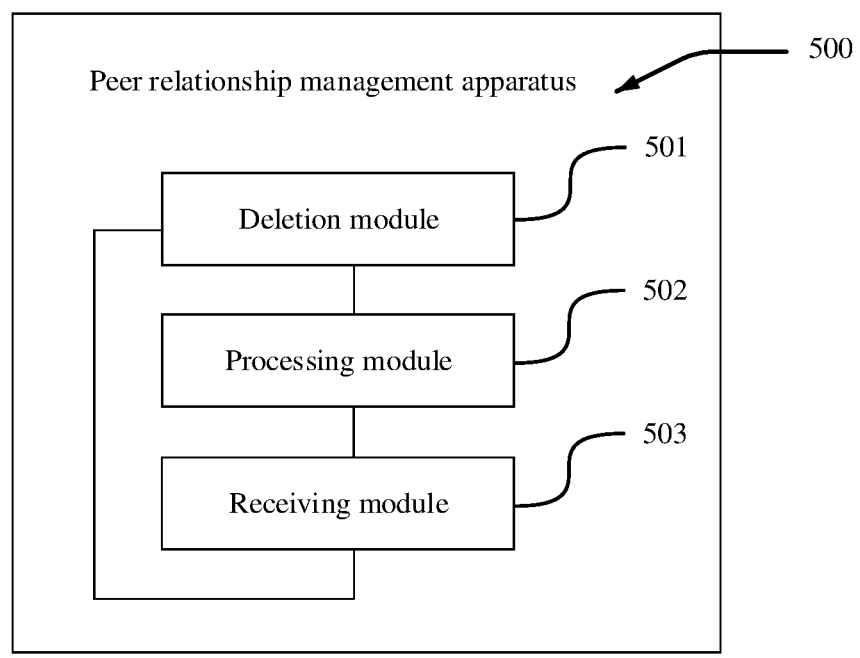
FIG. 5 is a schematic structural diagram of a peer relationship management apparatus 500 according to an embodiment of this application.

FIG. 5 is a schematic structural diagram of a peer relationship management apparatus 500 according to an embodiment of this application. The apparatus 500 is applied to a first routing device. As shown in FIG. 5, the apparatus 500 includes: a deletion module 501, configured to perform step 403; a processing module 502, configured to perform step 405; and a receiving module 503, configured to perform step 407. The deletion module 501 is further configured to perform step 409.

Optionally, the apparatus further includes a writing module, configured to perform step 404. The deletion module 501 is configured to perform step 408.

Optionally, the apparatus further includes an interruption module. The interruption module is configured to perform the step in any one of scenario 1 to scenario 3 in step 403.

Optionally, the apparatus further includes: a generation module, configured to generate a second notification message when the configuration instruction is received; and a sending module, configured to send the second notification message to a second routing device.

Optionally, the apparatus further includes a starting module. The starting module is configured to perform a step in any one of trigger condition 1 and trigger condition 2.

Optionally, the apparatus further includes an enabling module. The enabling module is configured to enable a target capability for the second routing device.

It should be noted that when the peer relationship management apparatus provided in the embodiment shown in FIG. 5 manages a peer relationship, division of the foregoing functional modules is used only as an example for description. In actual application, the foregoing functions may be allocated to different functional modules and implemented according to a requirement, that is, an internal structure of the peer relationship management apparatus is divided into different functional modules for implementing all or some of the functions described above. In addition, the peer relationship management apparatus provided in the foregoing embodiment and the embodiment of the peer relationship management method pertain to a same concept. For a specific implementation process thereof, refer to the method embodiment. Details are not described herein again.

It should be understood that the apparatus 500 herein is represented in a form of a functional module. The term "module" herein may refer to an application-specific integrated circuit (ASIC), an electronic circuit, a processor (for example, a shared processor, a dedicated purpose processor, or a group processor) configured to execute one or more software or firmware programs, a memory, a merge logic circuit, and/or another suitable component that supports the described function. In an optional example, a person skilled in the art may understand that the apparatus 500 may be specifically the peer relationship management apparatus in the foregoing embodiment, and the apparatus 500 may be configured to perform procedures and/or steps corresponding to the peer relationship management apparatus in the foregoing method embodiment. To avoid repetition, details are not described herein again.

The apparatus 500 in the foregoing solutions has a function of implementing a corresponding step performed by the peer relationship management apparatus in the foregoing method. The function may be implemented by hardware, or may be implemented by hardware by executing corresponding software. The hardware or the software includes one or more modules corresponding to the foregoing function. For example, the receiving module may be replaced by a receiver, and the processing module may be replaced by a processor, to separately perform a sending and receiving operation and a related processing operation in the method embodiments.

In an example embodiment, a computer program product is provided. The computer program product includes computer program code. When the computer program code is run by a computer, the computer is enabled to perform the foregoing peer relationship management method.

In an example embodiment, a computer-readable medium is provided, and is configured to store a computer program. The computer program includes an instruction used to perform the foregoing peer relationship management method. For example, the computer-readable medium may be a read-only memory (ROM), a random access memory (RAM), a compact disc read-only memory (CD-ROM), a magnetic tape, a floppy disk, an optical data storage device, or the like.

In an example embodiment, this application further provides a chip, including a processor, configured to invoke and run instructions stored in a memory, to enable a device in which the chip is installed to perform the foregoing peer relationship management method.

In an example embodiment, this application further provides a chip, including an input interface, an output interface, a processor, and a memory. The input interface, the output interface, the processor, and the memory are connected to each other through an internal connection path. The processor is configured to execute code in the memory. When the code is executed, the processor is configured to perform the foregoing peer relationship management method.

All or some of the foregoing embodiments may be implemented by software, hardware, firmware, or any combination thereof. When software is used to implement the embodiments, all or some of the embodiments may be implemented in a form of a computer program product. The computer program product includes one or more computer program instructions. When the computer program instructions are loaded and executed on a computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer program instructions may be transmitted from a website, computer, server, or data center to another website, computer, server, or data center in a wired or wireless manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive), or the like.

The term "and/or" in this application describes only an association relationship for describing associated objects and indicates that three relationships may exist. For example, A and/or B may indicate the following three cases: Only A exists, both A and B exist, and only B exists. In addition, the character "/" in this application usually indicates an "or" relationship between the associated objects.

In this application, the term "a plurality of" means two or more. For example, a plurality of data packets are two or more data packets.

In this application, terms such as "first" and "second" are used to distinguish between same items or similar items that have basically same functions. A person skilled in the art may understand that the terms such as "first" and "second" do not limit a quantity and an execution sequence.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, a compact disc, or the like.

The foregoing descriptions are merely optional embodiments of this application, but are not intended to limit this application. Any modification, equivalent replacement, or improvement made without departing from the principle of this application shall fall within the protection scope of this application.

What is claimed is:

1. A method, applied to a first routing device, wherein the method comprises:
    interrupting a peer relationship between the first routing device and a second routing device based on a target address family capability being enabled for the second routing device, wherein the target address family capability is different from any address family capability that has been previously enabled for the second routing device;
    skipping deleting a first routing entry in a routing table when the peer relationship between the first routing device and the second routing device is interrupted, wherein the first routing entry is received by the first routing device from the second routing device;
    processing a service by using the first routing entry when the peer relationship between the first routing device and the second routing device is interrupted;
    receiving a second routing entry from the second routing device when the peer relationship is reestablished; and
    deleting a third routing entry from the routing table based on the first routing entry and the second routing entry, wherein the third routing entry belongs to the first routing entry and does not belong to the second routing entry.

2. The method according to claim 1, wherein
    before the receiving the second routing entry from the second routing device, the method further comprises:
        writing a ready-to-delete flag into each routing entry in the first routing entry; and the deleting the third routing entry from the routing table based on the first routing entry and the second routing entry comprises:
  selecting the third routing entry from the first routing entry based on the ready-to-delete flag in the first routing entry and based on the second routing entry.

3. The method according to claim 2, wherein the selecting the third routing entry from the first routing entry based on the ready-to-delete flag in the first routing entry and based on the second routing entry comprises:
  for each routing entry in the first routing entry, deleting the ready-to-delete flag of a corresponding routing entry from the first routing entry when the second routing entry comprises the corresponding routing entry; and
  selecting, from the first routing entry, a routing entry comprising the ready-to-delete flag as the third routing entry.

4. The method according to claim 1, wherein before the skipping deleting the first routing entry in the routing table, the method further comprises one of following:
  interrupting the peer relationship when a configuration instruction is received, wherein the configuration instruction instructs the first routing device to update stored configuration information related to the second routing device; or
  interrupting the peer relationship when a first notification message is received from the second routing device, wherein the first notification message notifies the first routing device to interrupt the peer relationship and skip deleting the first routing entry.

5. The method according to claim 4, wherein the method further comprises:
  generating a second notification message when the configuration instruction is received, wherein the second notification message notifies the second routing device to interrupt the peer relationship and skip deleting a fourth routing entry, and the fourth routing entry is a routing entry received by the second routing device from the first routing device; and
  sending the second notification message to the second routing device.

6. The method according to claim 1, wherein the method further comprises one of following:
  starting a timer when the peer relationship is interrupted, and when duration of the timer reaches preset duration, deleting the third routing entry from the routing table; or
  when a route update end message of the second routing device is received, deleting the third routing entry from the routing table.

7. The method according to claim 1, wherein before the skipping deleting the first routing entry in the routing table when the peer relationship between the first routing device and the second routing device is interrupted, the method further comprises:
  enabling a target capability for the second routing device, wherein the target capability is a capability of skipping deleting the first routing entry within a time range from a first time at which the peer relationship is interrupted to a second time at which the peer relationship is reestablished.

8. An apparatus, applied to a first routing device, wherein the apparatus comprises:
  at least one processor; and
  one or more memories coupled to the at least one processor and storing instructions for execution by the at least one processor, the instructions instruct the at least one processor to cause the apparatus to:
    interrupt a peer relationship between the first routing device and a second routing device based on a target address family capability being enabled for the second routing device, wherein the target address family capability is different from any address family capability that has been previously enabled for the second routing device;
    skip deleting a first routing entry in a routing table when the peer relationship between the first routing device and the second routing device is interrupted, wherein the first routing entry is received by the first routing device from the second routing device;
    process a service by using the first routing entry when the peer relationship between the first routing device and the second routing device is interrupted;
    receive a second routing entry from the second routing device when the peer relationship is reestablished; and
    delete a third routing entry from the routing table based on the first routing entry and the second routing entry, wherein the third routing entry belongs to the first routing entry and does not belong to the second routing entry.

9. The apparatus according to claim 8, wherein the instructions further instruct the at least one processor to cause the apparatus to:
  write a ready-to-delete flag into each routing entry in the first routing entry; and
  select the third routing entry from the first routing entry based on the ready-to-delete flag in the first routing entry and based on the second routing entry.

10. The apparatus according to claim 9, wherein the instructions further instruct the at least one processor to cause the apparatus to:
  for each routing entry in the first routing entry, delete the ready-to-delete flag in a corresponding routing entry from the first routing entry when the second routing entry comprises the corresponding routing entry; and
  select, from the first routing entry, a routing entry comprising the ready-to-delete flag as the third routing entry.

11. The apparatus according to claim 8, wherein the instructions further instruct the at least one processor to cause the apparatus to:
  interrupt the peer relationship when a configuration instruction is received, wherein the configuration instruction instructs the first routing device to update stored configuration information related to the second routing device; or
  interrupt the peer relationship when a first notification message is received from the second routing device, wherein the first notification message notifies the first routing device to interrupt the peer relationship and skip deleting the first routing entry.

12. The apparatus according to claim 11, wherein the instructions further instruct the at least one processor to cause the apparatus to:
  generate a second notification message when the configuration instruction is received, wherein the second notification message notifies the second routing device to interrupt the peer relationship and skip deleting a fourth routing entry, and the fourth routing entry is a routing entry received by the second routing device from the first routing device; and
  send the second notification message to the second routing device.

13. The apparatus according to claim 8, wherein the instructions further instruct the at least one processor to cause the apparatus to:
- start a timer when the peer relationship is interrupted, and when duration of the timer reaches preset duration, delete the third routing entry from the routing table; or
- when a route update end message of the second routing device is received, delete the third routing entry from the routing table.

14. The apparatus according to claim 8, wherein the instructions further instruct the at least one processor to cause the apparatus to: enable a target capability for the second routing device, wherein the target capability is a capability of skipping deleting the first routing entry within a time range from a first time at which the peer relationship is interrupted to a second time at which the peer relationship is reestablished.

\* \* \* \* \*